United States Patent
Bunn et al.

(10) Patent No.: US 7,277,193 B2
(45) Date of Patent: Oct. 2, 2007

(54) METHOD FOR PRINTING REMOTE CONTENT

(75) Inventors: Jeremy Bunn, Kelso, WA (US); Daniel Revel, Portland, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 931 days.

(21) Appl. No.: 10/062,973

(22) Filed: Jan. 29, 2002

(65) Prior Publication Data

US 2003/0142345 A1  Jul. 31, 2003

(51) Int. Cl.
*G06F 15/00* (2006.01)
*G06F 3/12* (2006.01)

(52) U.S. Cl. ..................... 358/1.15; 358/402

(58) Field of Classification Search ............... 358/1.15, 358/1.1, 401, 442; 379/100.01, 100.06
See application file for complete search history.

(56) References Cited

U.S. PATENT DOCUMENTS

| | | | | |
|---|---|---|---|---|
| 6,922,258 B2 * | 7/2005 | Pineau | ...................... | 358/1.15 |
| 7,016,062 B2 * | 3/2006 | Ishizuka | ................... | 358/1.15 |
| 2001/0029531 A1 | 10/2001 | Ohta | | |
| 2002/0016836 A1 | 2/2002 | Suzuki et al. | | |
| 2002/0113994 A1 * | 8/2002 | Smith et al. | ............... | 358/1.15 |
| 2003/0002072 A1 * | 1/2003 | Berkema et al. | ........... | 358/1.15 |

FOREIGN PATENT DOCUMENTS

| | | |
|---|---|---|
| GB | 2342197 | 4/2000 |
| JP | 06-342426 | 12/1994 |
| JP | 10-207657 | 8/1998 |
| JP | 10-228428 | 8/1998 |
| JP | 11-154072 | 6/1999 |
| JP | 11-249992 | 9/1999 |
| JP | 2000-112691 | 4/2000 |
| JP | 2000-293323 | 10/2000 |
| JP | 2001-256147 | 9/2001 |
| JP | 2002-014780 | 1/2002 |
| JP | 2002-014781 | 1/2002 |
| JP | 2002-014790 | 1/2002 |

OTHER PUBLICATIONS

European Search Report dated Jun. 30, 2005.
English translation of Japanese Office Action dated Dec. 6, 2004.
Co-pending, Hewlett-Packard Company, U.S. Appl. No. 09/987,693, filed Jun. 29, 2001, entitled: "Print by Reference Service Communication Protocol and Interface".

* cited by examiner

*Primary Examiner*—Gabriel I. Garcia

(57) ABSTRACT

In a method of printing using a mobile device, the mobile device accesses remote content. An archive file containing the remote content is generated on the mobile device or on a proxy server on a network. The mobile device then transmits a print request to an imaging device, and the imaging device requests and receives the archive file and prints the content.

34 Claims, 5 Drawing Sheets

METHOD FOR PRINTING REMOTE CONTENT

INTRODUCTION

The present invention relates generally to mobile electronic devices and to imaging devices.

Mobile electronic devices, such as mobile phones and personal digital assistants (PDA's), enjoy increasing popularity. The capabilities and functionality of these devices also continue to increase. For example, many of these devices have Internet browsing capability, which affords access to a wide variety of content and commercial service opportunities.

One drawback with mobile electronic devices is that their limited memory, display and bandwidth capabilities restrict the type and amount of content readily available to a device user. Typically, content is formatted specifically for a mobile electronic device in a manner designed to conserve device resources. In general, rich or data-intensive content is avoided in favor of more streamlined content.

In the field of printing, these resource limitations of mobile electronic devices restrict printing opportunities. In general, the traditional printing model involves pushing content resident on an electronic device, such as a PC, to an imaging device. Many imaging devices, such as personal inkjet printers, must receive the content rendered in a printer-ready format, such as PCL-3 or other page description language. Thus, the electronic device sending the print request must first convert the content into the appropriate printer-ready format.

One attempt to increase the printing capabilities of mobile electronic devices involves referencing data content resident on a remote content provider, sometimes known as "print-by-reference". In one example of the print-by-reference printing model, the user of a mobile device sends a print-by-reference print request to an imaging device. The print-by-reference request may include, for example, a uniform resource locator (URL) address for the content to be printed. If the content is in a printer-ready format, the imaging device may use the URL to retrieve the content directly from the remote content provider and then print the content. If the content is not in a printer-ready format, the imaging device may transmit the request to a remote print service. The print service then retrieves the content from a content provider, renders the content into the printer-ready format appropriate for the imaging device and transmits the content to the imaging device for printing.

One drawback with the traditional print-by-reference model arises when the remote content resides on a secure web page. The server hosting the web page may require security information, such as a username and password, before access is allowed. For example, the user of a mobile device may access a secure on-line banking service that requires the user to provide security information prior to initiating the secure session. The user may then desire to use print-by-reference to print a bank statement that the user is viewing during the secure session. In this situation, if the imaging device or print service simply provides the URL of the bank statement to the secure server, without the proper security information, then access will be denied. Another drawback with the traditional print-by reference model is that it requires the imaging device to have TCP/IP connectivity to enable the imaging device to communicate with the remote content provider and/or print service over a network. Thus, it would be desirable to provide an improved printing method that addresses these types of situations and allows for greater flexibility in the printing process.

DETAILED DESCRIPTION OF THE PREFERRED EMBODIMENTS

Figure 1:
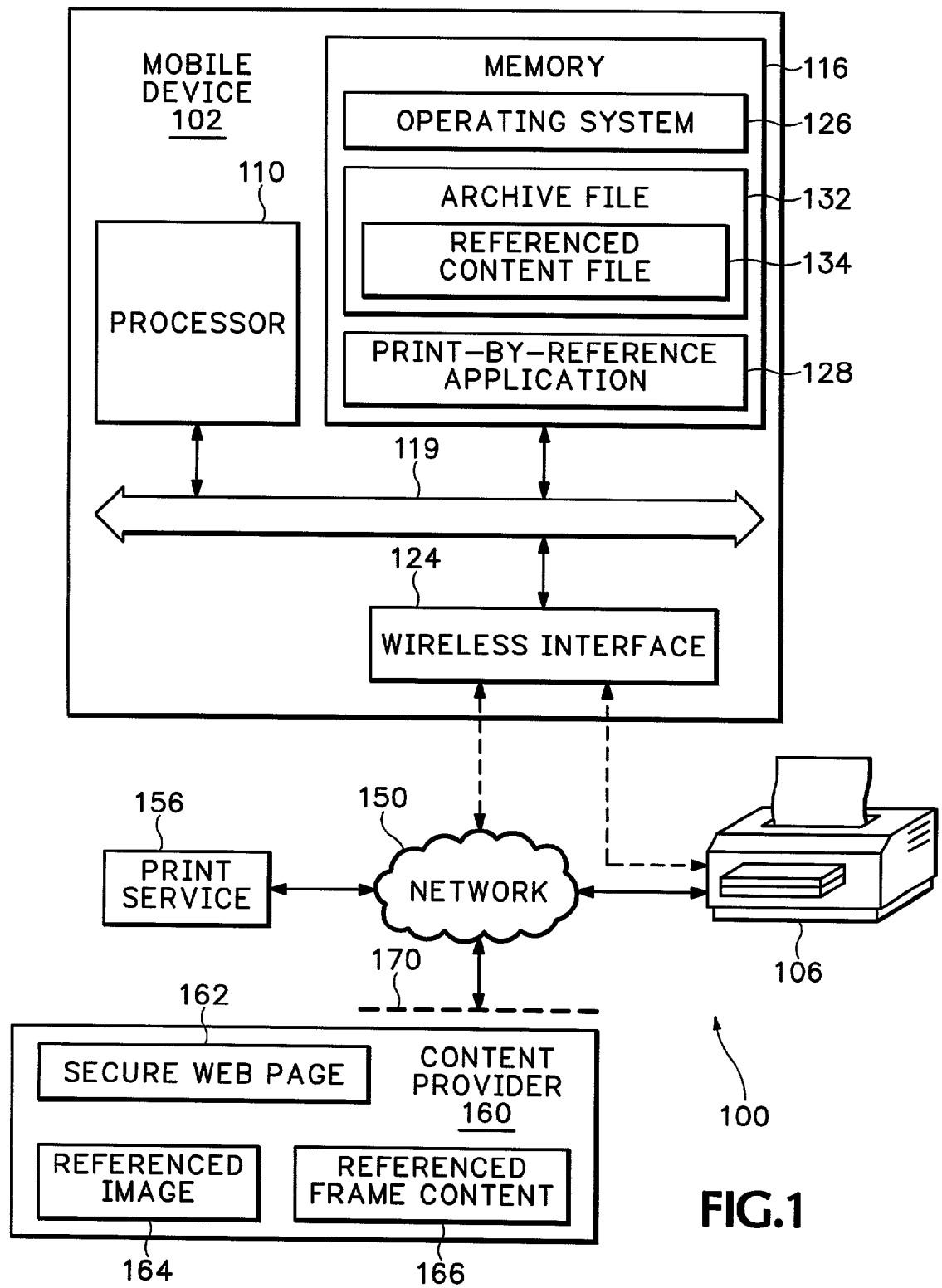
FIG. 1 is a block diagram of an exemplary wireless printing configuration that may be utilized in practicing the methods of the present invention.

FIG. 1 illustrates an embodiment of a wireless printing configuration 100 that may be utilized to practice the methods of the present invention. The wireless printing configuration 100 includes a mobile electronic device 102 and an imaging device 106. The imaging device may comprise, for example, an inkjet or electrophotographic printer, a fax machine, a multi-function printer/copier/scanner device, a copier or the like. The mobile electronic device 102 may comprise, for example, a personal digital assistant (PDA), a mobile phone, a laptop PC, a wireless data terminal, or other such device with like capabilities. The mobile electronic device 102 includes a processor 110 and a memory 116, both of which are coupled to a local interface 119. The local interface may be, for example, a data bus with an accompanying control/address bus as is generally know by those with ordinary skill in the art.

The mobile device 102 also includes a wireless interface 124 that is coupled to the local interface 119 and facilitates wireless communication with the imaging device 106 and other wireless devices and/or networks. The wireless interface 124 may include, for example, a wireless modem and an appropriate network card that may be employed to transmit data to and receive data from the imaging device 106 and across the network 150. Any of various wireless communication protocols may be utilized by the mobile device 102, including but not limited to infrared, Bluetooth, RF protocol and IEEE 802.11 RF protocol. The network 150 may comprise, for example, the Internet, wide area networks, local area networks or other similar networks.

The memory 116 stores several components that are executable by the processor 110. These components include, for example, an operating system 126 and a print-by-reference application 128. The operating system 126 is executed to control the allocation and usage of hardware resources in the mobile device 102. For example, the operating system 126 controls the allocation and usage of the memory 116 and processing time, as well as performing other functionality as is generally know by those with ordinary skill in the art.

The print-by-reference application 128 may operate to execute a traditional print-by-reference printing model. For example, the user of the mobile device 102 may transmit a print-by-reference print request to the imaging device 106. The print-by-reference print request may contain, for example, a URL address of the content to be printed. The content may be, for example, a web page or other document located on the network 150. If the content is in a printer-ready format, the imaging device may use the URL to retrieve the content directly from a remote content provider 160 over the network 150 and then print the content. If the content is not in a printer-ready format, the imaging device may transmit the request to a remote print service 156 over the network 150. The print service 156 then retrieves the content from the content provider 160, renders the content into the printer-ready format appropriate for the imaging device and transmits the rendered content to the imaging device for printing. A more detailed description of a print-by-reference printing model is available in U.S. patent application Ser. No. 09/897,693 entitled PRINT BY REFERENCE SERVICE COMMUNICATION PROTOCOL AND INTERFACE and assigned to Hewlett-Packard Co. U.S. patent application Ser. No. 09/897,693 is incorporated herein by reference in its entirety.

In some situations the content to be printed may be located on a secure web page 162, and the content provider 160 may reside on a server that requires security information or other contextual information, such as cookies, as a condition for access. The content provider may also be located behind a firewall 170 that only allows access via email, a virtual private network (VPN) or other designated and approved mechanism. While the mobile device 102 may provide the required security or contextual information and/or be able to traverse the firewall 170 to view the secure web page 162, the imaging device 106 may be unable to provide the required information or to traverse the firewall 170. Additionally, in some situations the imaging device 106 may not have TCP/IP or other connectivity with the network 150, and thus may be unable to directly access the content provider 160 or print service 156.

Figure 2:
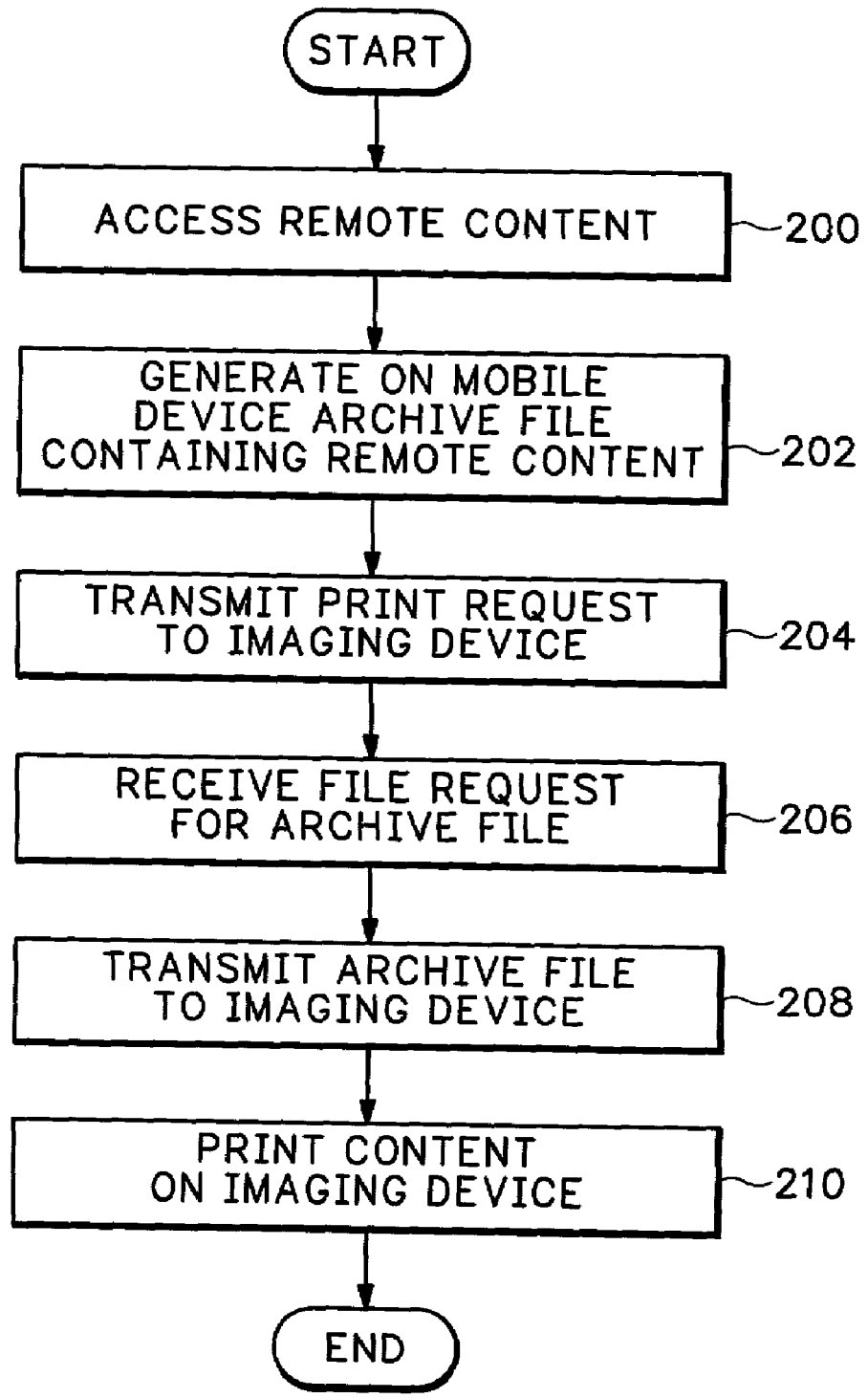
FIG. 2 is a flow chart of the steps of one embodiment of the present invention.

To address these situations, and with reference now to one embodiment of the present invention, the print-by-reference application 128 may also operate to generate an archive file 132 of the content to be printed and transmit the archive file to the imaging device 106 for printing. Advantageously, in this method of the present invention the imaging device 106 does not need to traverse the firewall 170 or to pass security or contextual information to the content provider 160. In one embodiment of the present invention, the print-by-reference application 128 generates the archive file 132 in the memory 116 of the mobile device 102. With reference now to FIG. 2, a flow chart of this embodiment of the present invention is illustrated. Beginning with block 200, the mobile device 102 accesses the remote content to be printed via network 150. The remote content may be, for example, a secure web page 162 located on content provider 160 and behind a firewall 170. The mobile device may transmit security information to the server hosting the secure web page 162 to gain access to the web page.

In block 202 the print-by-reference application 128 generates on the mobile device 102 an archive file 132 containing the web page 162. The archive file 132 may take the form of an HTML document, an XHTML document or other markup language document. The web page 162 may contain one or more links to referenced content, such as a referenced image 164 and/or referenced frame content 166. It will be appreciated that the referenced content may reside on the same server as the web page 162 as shown in FIG. 1 or at another location on the network 150. In generating the archive file 132, the print-by-reference application 128 rewrites the links to any referenced content to refer to a referenced content file 134 in the archive file 132. In block 204 the mobile device 102 transmits a print request to the imaging device 106 that includes a reference that indicates a location of the archive file on the mobile device.

In block 206 the mobile device 102 receives a file request from the imaging device 106 for the archive file. In block 208 the mobile device 102 transmits the archive file 132 to the imaging device 106. If the archive file is in a printer-ready format, then the imaging device renders the archive file to create rendered content and prints the rendered content (block 210). Alternatively, if the content is not in a printer-ready format, the imaging device 106 may transmit the archive file to a remote print service 156 over the network 150. For example, if the archive file is an HTML document and the imaging device is unable to render HTML, the imaging device may transfer the archive file to a print service 156 that includes an HTML rendering engine. The print service 156 then renders the content into the printer-ready format appropriate for the imaging device 106 and transmits the rendered content to the imaging device for printing.

Figure 3:
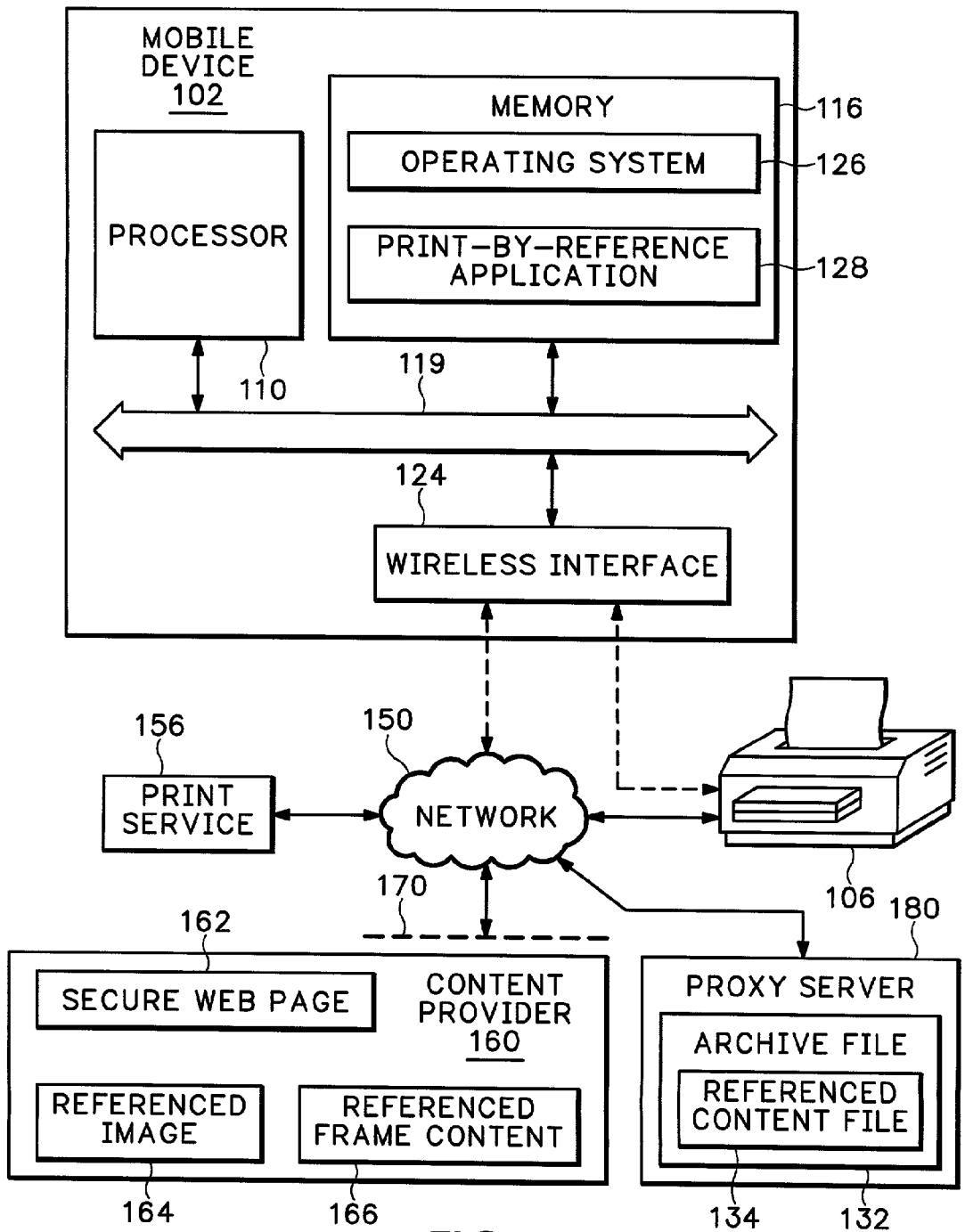
FIG. 3 is a block diagram of an alternative exemplary wireless printing configuration that may be utilized in practicing the methods of the present invention.
Figure 4:
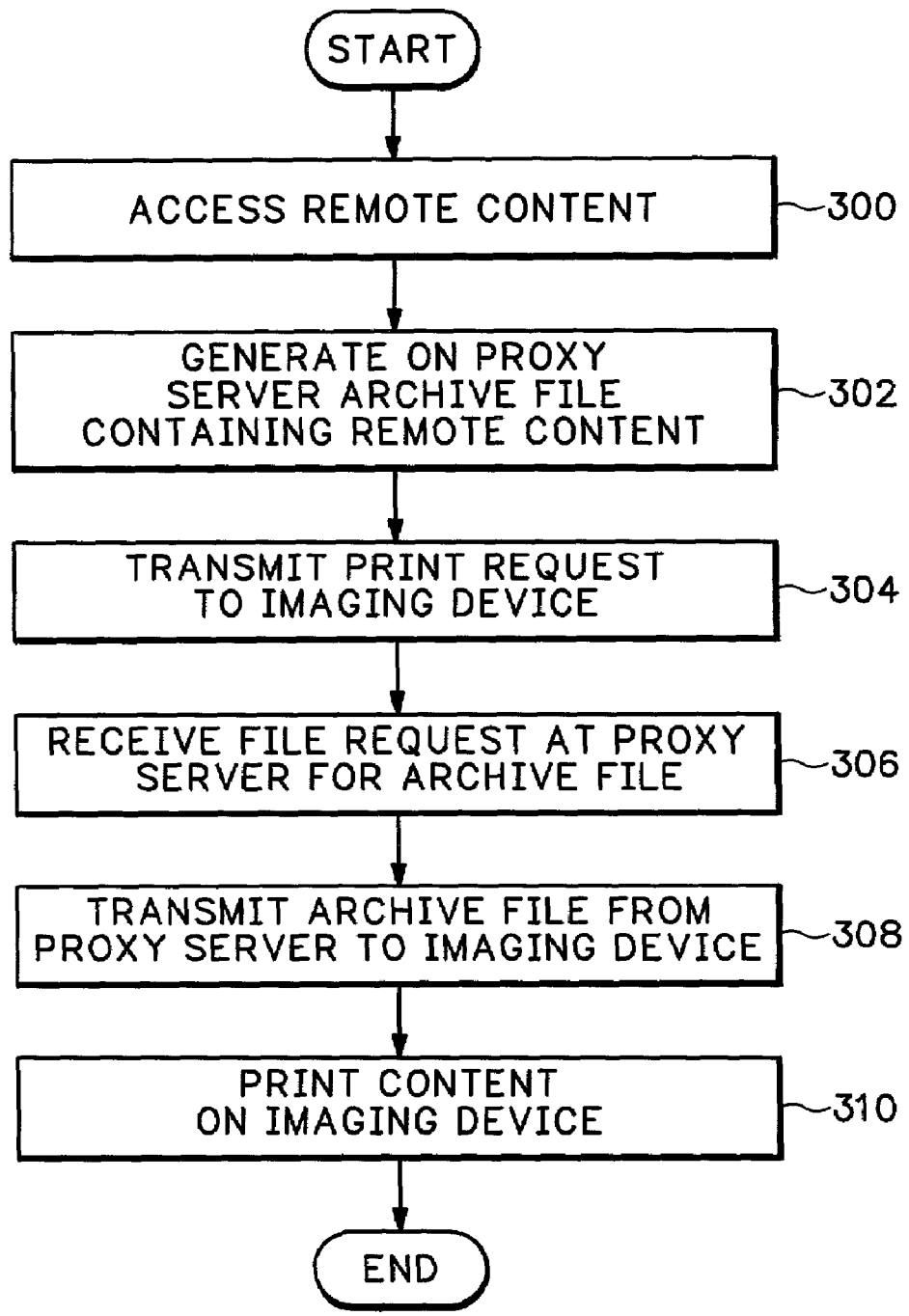
FIG. 4 is a flow chart of the steps of another embodiment of the present invention.

With reference now to FIG. 3, in an alternative embodiment the archive file 132 may be generated on a remote proxy server 180 instead of the mobile device 102. Advantageously, in this embodiment a mobile device 102 with limited resources is not required to store the archive file 132 in its memory 116. With reference now to FIG. 4, a flow chart of this embodiment of the present invention is illustrated. Beginning with block 300, the mobile device 102 accesses the remote content to be printed via network 150. The remote content may be, for example, a secure web page 162 located on content provider 160 and behind a firewall 170. The mobile device may transmit security information to the server hosting the secure web page 162 to gain access to the web page.

In block 302 the print-by-reference application 128 generates on a proxy server 180 an archive file 132 containing the web page 162. The archive file 132 may take the form of an HTML document, an XHTML document or other markup language document. The web page 162 may contain one or more links to referenced content, such as a referenced image 164 and/or referenced frame content 166. It will be appreciated that the referenced content may reside on the same server as the web page 162 as shown in FIG. 3 or at another location on the network 150. In generating the archive file 132 on the proxy server 180, the print-by-reference application 128 rewrites the links to any referenced content to refer to a referenced content file 134 in the archive file 132. In block 304 the mobile device 102 transmits a print request to the imaging device 106 that includes a reference that indicates a location of the archive file 132 on the proxy server 180.

In block 306 the proxy server 180 receives a file request from the imaging device 106 via the network 150 for the archive file 132. In block 308 the proxy server 180 transmits the archive file 132 to the imaging device 106. If the archive file is in a printer-ready format, then the imaging device renders the archive file to create rendered content and prints the rendered content (block 310). Alternatively, if the content is not in a printer-ready format, the imaging device 106 may transmit the archive file to a remote print service 156 over the network 150. For example, if the archive file is an HTML document and the imaging device is unable to render HTML, the imaging device may transfer the archive file to a print service 156 that includes an HTML rendering engine. The print service 156 then renders the content into the printer-ready format appropriate for the imaging device 106 and transmits the rendered content to the imaging device for printing.

Figure 5:
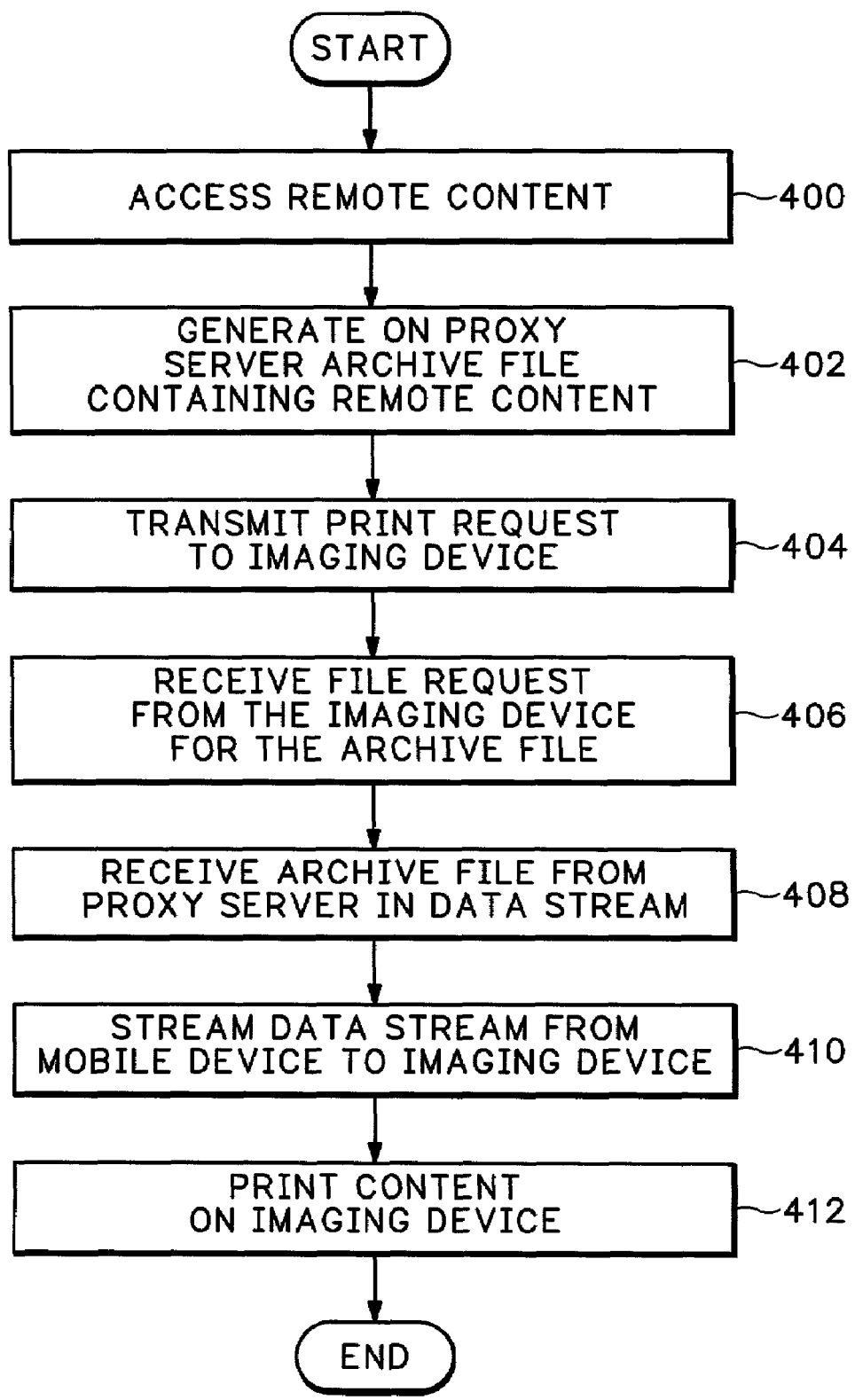
FIG. 5 is a flow chart of the steps of another embodiment of the present invention.

In some situations the imaging device 106 may be a directly connected desktop device and may not have access to the network 150. In this situation, the archive file 132 may be streamed from the proxy server through the mobile device 102 via the network 150, and from the mobile device 102 to the imaging device 106 via a wireless communications protocol. With reference now to FIG. 5, a flow chart of this embodiment of the present invention is illustrated. Beginning with block 400, the mobile device 102 accesses the remote content to be printed via network 150. The remote content may be, for example, a secure web page 162 located on content provider 160 and behind a firewall 170. The mobile device may transmit security information to the server hosting the secure web page 162 to gain access to the web page.

In block 402 the print-by-reference application 128 generates on the proxy server 180 an archive file 132 containing the web page 162. The archive file 132 may take the form of an HTML document, an XHTML document or other markup language document. The web page 162 may contain one or more links to referenced content, such as a referenced image 164 and/or referenced frame content 166. It will be appreciated that the referenced content may reside on the same server as the web page 162 or at another location on the network 150. In generating the archive file 132 on the proxy server 180, the print-by-reference application 128 rewrites the links to any referenced content to refer to a referenced content file 134 in the archive file 132. In block 404 the mobile device 102 transmits a print request to the imaging device 106 that includes a reference that indicates a location of the archive file on the proxy server 180.

In block 406 the mobile device 102 receives a file request from the imaging device 106 for the archive file 132. In block 408 the mobile device 102 receives the archive file 132 in a data stream from the proxy server 180. In block 410 the mobile device 102 streams the archive file data stream to the imaging device 106. Preferably, the archive file is in a printer-ready format, and the imaging device then renders the archive file to create rendered content and prints the rendered content (block 412). With reference to FIGS. 1 and 3, it will be appreciated that the memory 116 may include both volatile and nonvolatile memory and data storage components. Volatile components are those that do not retain data values upon loss of power. Nonvolatile components are those that retain data upon a loss of power. Thus, the memory 116 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components.

The method of printing of the present invention may be embodied in software or code executed by general purpose hardware as discussed above, or may be embodied in dedicated hardware or a combination of software/general purpose hardware and dedicated hardware. If embodied in hardware, the method of printing may be expressed or implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, programmable gate arrays (PGAs), field programmable gate arrays (FPGAs), or other components. Such technologies are generally well known by those of ordinary skill in the art.

The block diagrams of FIGS. 2 and 3-5 show the architecture, functionality and operation of an implementation of the method of printing of the present invention. If embodied in software, each block may represent a module, segment or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

While the block diagrams of FIGS. 2 and 3-5 may show a specific order of execution, it will be appreciated that two or more steps in the diagrams that are shown executed in succession may be executed concurrently or with partial concurrence. The block diagrams are relatively self-explanatory and may be utilized by one of ordinary skill in the art to create software and/or hardware to carry out the various logical functions described and illustrated.

Where the method of the present invention comprises software or code, it may be embodied in any computer-readable medium for use by or in connection with an instruction execution system such as, for example, a processor in a computer system or other system. In this sense, the method of the present invention may comprise, for example, statements including instructions and declarations that may be fetched from the computer-readable medium and executed by the instruction execution system. In the context of the present invention, a "computer-readable medium" may be any medium that can contain, store or otherwise maintain the method of the present invention for use by or in connection with an instruction execution system.

It will be appreciated that a variety of other equivalent modifications and substitutions may be made to the method of the present invention according to the concepts covered herein, depending upon the particular implementation, while still falling within the scope of the claims below.

We claim:

1. A method of printing using a mobile device, comprising:
    accessing remote content including a document comprising a web page that contains a link to referenced content;
    generating on the mobile device an archive file containing the document, including forming a modified web page in which the link is rewritten to refer to a referenced content file in the archive file instead of the referenced content;
    transmitting a print request to an imaging device;
    receiving a file request from the imaging device for the archive file; and
    transmitting the archive file to the imaging device, whereby the imaging device prints the content.

2. The method of claim 1, wherein the print request includes a reference that indicates a location of the archive file.

3. The method of claim 1, wherein the steps of transmitting the print request to the imaging device and transmitting the archive file to the imaging device each comprise transmitting using a wireless communication protocol.

4. The method of claim 1, further comprising the steps of:
rendering the archive file on the imaging device to create rendered content; and
printing the rendered content.

5. The method of claim 1, further comprising the steps of:
transmitting the archive file from the imaging device to a print service;
rendering the archive file on the print service to create rendered content; and
transmitting the rendered content from the print service to the imaging device, whereby the imaging device prints the rendered content.

6. The method of claim 5, wherein the archive file comprises an HTML file and wherein the print service comprises an HTML rendering engine.

7. The method of claim 1, wherein the remote content is located behind a firewall on a secure server that is not accessible by the imaging device, and the step of accessing the remote content comprises transmitting security information from the mobile device to the secure server.

8. The method of claim 1, wherein the mobile device is used to access the remote content, transmit the print request to the imaging device, receive the file request from the imaging device for the archive file and transmit the archive file to the imaging device.

9. The method of claim 1, wherein the document is a markup-language document.

10. The method of claim 1, wherein the archive file that contains the document further contains a referenced content file different from the document.

11. The method of claim 1, wherein the referenced content is external to the mobile device.

12. The method of claim 11, wherein the referenced content is inaccessible to the imaging device.

13. A method of printing using a mobile device, comprising:
accessing remote content including a document, wherein the remote content comprises a web page that contains a link to a referenced image;
generating on a proxy server an archive file containing the document, including rewriting the link to refer to a referenced image file in the archive file instead of the referenced image;
transmitting a print request to an imaging device, the print request including a reference that indicates a location of the archive file on the proxy server;
receiving a file request at the proxy server from the imaging device for the archive file; and
transmitting the archive file from the proxy server to the imaging device, whereby the imaging device prints the content.

14. The method of claim 13, wherein the step of transmitting the print request to the imaging device comprises transmitting using a wireless communication protocol.

15. The method of claim 13, wherein the step of generating on a proxy server an archive file further comprises generating the archive file in a format that may be rendered by the imaging device.

16. The method of claim 13, further comprising the steps of:
transmitting the archive file from the imaging device to a print service;
rendering the archive file on the print service to create rendered content; and
transmitting the rendered content from the print service to the imaging device, whereby the imaging device prints the rendered content.

17. The method of claim 16, wherein the archive file comprises an HTML file and wherein the print service comprises an HTML rendering engine.

18. The method of claim 13, wherein the remote content is located behind a firewall on a secure server, and the step of accessing the remote content comprises transmitting security information from the mobile device to the secure server.

19. The method of claim 13, wherein the mobile device is used to access the remote content and transmit the print request to the imaging device.

20. The method of claim 13, wherein the document is a markup-language document.

21. A method of printing using a mobile device, comprising:
accessing remote content including a document, wherein the remote content comprises a web page that contains a link to a referenced image;
generating on a proxy server an archive file containing the document, including rewriting the link to refer to a referenced image file in the archive file instead of the referenced image;
transmitting a print request to an imaging device;
receiving a file request from the imaging device for the archive file;
transmitting the file request to the proxy server;
receiving the archive file from the proxy server in a data stream; and
streaming the data stream of the archive file from the mobile device to the imaging device, whereby the imaging device prints the content.

22. The method of claim 21, wherein the imaging device does not have network access capability, and wherein the step of transmitting the print request to the imaging device comprises transmitting using a wireless communication protocol.

23. The method of claim 21, wherein the step of generating on a proxy server an archive file further comprises generating the archive file in a format that may be rendered by the imaging device.

24. The method of claim 21, further comprising the steps of:
transmitting the archive file from the imaging device to a print service;
rendering the archive file on the print service to create rendered content; and
transmitting the rendered content from the print service to the imaging device, whereby the imaging device prints the rendered content.

25. The method of claim 24, wherein the archive file comprises an HTML file and wherein the print service comprises an HTML rendering engine.

26. The method of claim 21, wherein the remote content is located behind a firewall on a secure server, and the step of accessing the remote content comprises transmitting security information from the mobile device to the secure server.

27. The method of claim 21, wherein the mobile device is used to access the remote content, to transmit the print request to the imaging device, to receive the file request from the imaging device for the archive file, to transmit the file request to the proxy server and to receive the archive file from the proxy server in a data stream.

28. The method of claim 21, wherein the proxy server streams the data stream of the archive file to the mobile device via a network communications interface, and wherein the mobile device streams the data stream of the archive file to the imaging device via a non-network communications interface.

29. A computer program product for mobile printing comprising:
a computer readable medium comprising at least one of hardware and software, the medium including:
code that accesses remote content including a document comprising a web page that contains a link to referenced content;
code that generates on a mobile device an archive file containing the document including forming a modified web page in which the link is rewritten to refer to a referenced content file in the archive file instead of the referenced content;
code that transmits a print request to an imaging device;
code that receives a file request from the imaging device for the archive file; and
code that transmits the archive file to the imaging device, whereby the imaging device prints the content.

30. The computer program product of claim 29, wherein the code causes a mobile device to access the remote content, to transmit the print request to the imaging device, to receive the file request from the imaging device for the archive file and to transmit the archive file to the imaging device.

31. A computer program product for mobile printing comprising:
a computer readable medium comprising at least one of hardware and software, the medium including:
code that accesses remote content including a document, wherein the remote content comprises a web page that contains a link to a referenced image;
code that generates on a proxy server an archive file containing the documents, including rewriting the link to refer to a referenced image file in the archive file instead of the referenced image;
code that transmits a print request to an imaging device, the print request including a reference that indicates a location of the archive file on the proxy server;
code that receives a file request at the proxy server from the imaging device for the archive file; and
code that transmits the archive file from the proxy server to the imaging device, whereby the imaging device prints the content.

32. The computer program product of claim 31, wherein the code is configured to direct a mobile device to access the remote content and to transmit the print request to the imaging device.

33. A computer program product for mobile printing comprising:
a computer readable medium comprising at least one of hardware and software, the medium including:
code that accesses remote content including a document, wherein the remote content comprises a web page that contains a link to a referenced image;
code that generates on a proxy server an archive file containing the document, including rewriting the link to refer to a referenced image file in the archive file instead of the referenced image;
code that transmits a print request to an imaging device, the print request including a reference that indicates a location of the archive file on the proxy server;
code that receives a file request from the imaging device for the archive file;
code that transmits the file request to the proxy server;
code that receives the archive file from the proxy server in a data stream; and
code that streams the data stream of the archive file from the mobile device to the imaging device, whereby the imaging device prints the content.

34. The computer program product of claim 33, wherein the code is configured to direct a mobile printing device to access the remote content, to transmit the print request to the imaging device, to receive the file request from the imaging device for the archive file, to transmit the file request to the proxy server and to receive the archive file from the proxy server in a data stream.

* * * * *

UNITED STATES PATENT AND TRADEMARK OFFICE
CERTIFICATE OF CORRECTION

PATENT NO. : 7,277,193 B2 Page 1 of 1
APPLICATION NO. : 10/062973
DATED : October 2, 2007
INVENTOR(S) : Jeremy Bunn et al.

It is certified that error appears in the above-identified patent and that said Letters Patent is hereby corrected as shown below:

In column 7, line 2, in Claim 4, delete "crcatc" and insert -- create --, therefor.

In column 9, line 36, in Claim 31, delete "documents" and insert -- document --, therefor.

Signed and Sealed this

Fifth Day of August, 2008

JON W. DUDAS
*Director of the United States Patent and Trademark Office*